United States Patent Office 3,234,409
Patented Feb. 8, 1966

3,234,409
TEMPERATURE RESPONSIVE CONTROL APPARATUS
Adrian Anthony Cecil March, Chalfont St. Peter, Bucks, and Kenneth Marden Henfrey, Pyrford Woods, Surrey, England, assignors, by mesne assignments, to Wilmot Castle Company, Rochester, N.Y., a company of New York
Filed Oct. 3, 1960, Ser. No. 60,012
Claims priority, application Great Britain, Mar. 3, 1960, 7,635/60
19 Claims. (Cl. 307—141)

The present invention relates to temperature responsive control apparatus and has for an object to provide an improved such apparatus for effecting a control operation after a predetermined period of time during which a given temperature is maintained, and provided with integrating means for adjusting the said period of time if the temperature varies from said given temperature during the said period.

The apparatus according to the invention will be referred to as a time temperature integrator, and comprises an electrically operated timing device for effecting a control operation after a predetermined period of time, an energy regulator for controlling the electrical supply to the said timing device to vary the said predetermined period of time, and a temperature sensitive means responsive to the temperature maintained during said period and operatively connected to said energy regulator for controlling operation thereof to adjust the time period of the timing device in accordance with variations in the said temperature.

The time temperature integrator of the invention accordingly provides control means which operates after a given period of time during which a predetermined temperature is maintained in, for example, a chamber or the like, and adjusts the length of the period in order to compensate for variations of the temperature. The compensating effect of the integrator depends on the operative connection of the temperature sensitive means to the energy regulator, and this can be designed to provide a compensation which follows an established law, for example, a logarithmic relationship between time and temperature.

The time temperature integrator according to the invention is applicable, for example, to the control of the sterilizing time of a sterilizing chamber so that if the temperature of the chamber should fall during sterilization below the preset temperature, the sterilizing time is correspondingly lengthened. One embodiment of the invention will now be described in more detail with reference to the accompanying drawings in which.

Figure 1:
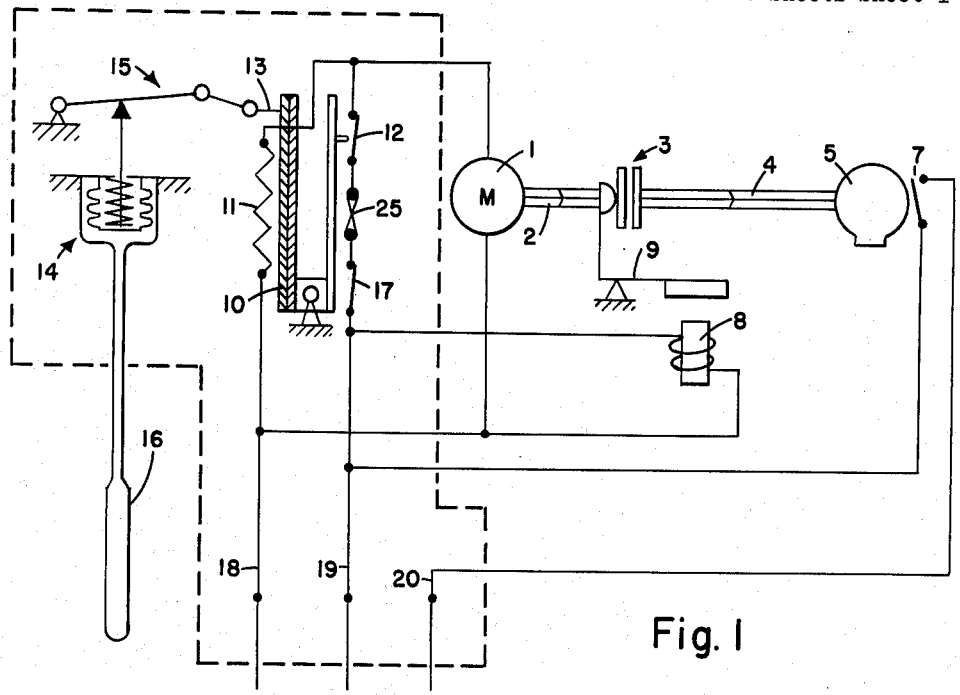
FIG. 1 shows diagrammatically one form of time-temperature integrator according to the invention.

Referring to FIG. 1 of the drawings the time-temperature integrator shown therein comprises a synchronous timer motor 1 having a driving shaft 2 connected to one member of an electromagnetically operated clutch indicated diagrammatically at 3, the other member of the clutch being connected to another shaft 4 upon which is mounted a cam 5 controlling a switch 7.

The longer times required at lower temperatures to produce complete sterilization, as it would be accomplished by the preselected temperature if consistently maintained for the preselected period of time, are determined by our invention which interrupts the supply of energy to the timer motor 1 in the manner described below.

After a predetermined angular rotation of this cam, the switch 7 is actuated or closed thereby. This cam serves to control the duration of the shortest sterilizing period necessary to accomplish complete sterilization at a preselected temperature for a preselected period of time.

The cam shaft 4 is biassed to return the cam to its normal unoperative position shown in FIG. 1 by suitable means such as for example a return spring (not shown). The clutch 3 is operated by an electromagnet 8 through a lever 9 so that when the electromagnet 8 is energized the clutch is engaged to transmit the drive from the driving shaft 2 to the cam shaft 4, and when the electromagnet is de-energized the clutch is released to permit the cam 5 to return to its normal position under the action of the biassing means of the cam shaft 4.

The control unit included within the broken line II of FIG. 1 comprises a bi-metallic strip operated energy regulator in which the bi-metallic strip 10 is heated by an electrical heater 11 and operates a switch contact 12 to open periodically the circuit of the motor 1 thereby to control the sterilizing time in accordance with the temperature in the sterilizing chamber as will hereinafter be described. Thus the heater 11 is connected in parallel with the motor 1 and when the motor is energized the heater 11 heats the strip 10 which then operates the contact 12 to open the circuit of the motor and the heater. The strip 10 then cools and allows the contact 12 to close thereby re-energizing the motor and the heater and initiating a further heating cycle.

Figure 3:
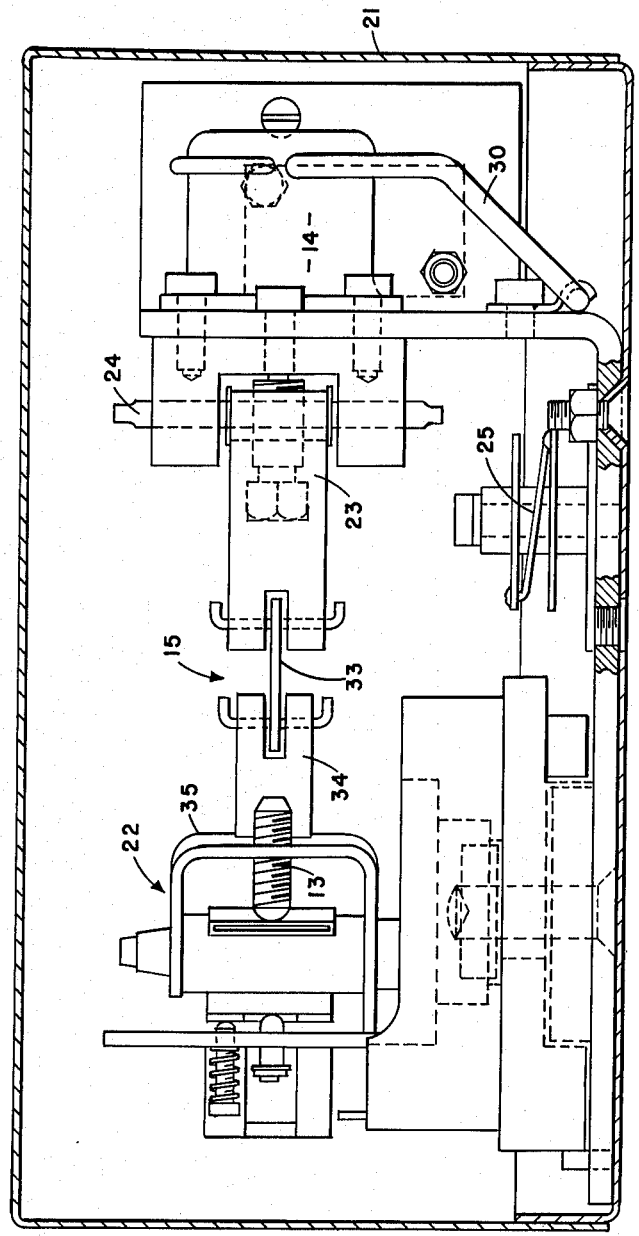
FIG. 3 is a side elevation of a specific construction of the control unit of the integrator of FIG. 1 included within the broken line II in FIG. 1.
Figure 4:
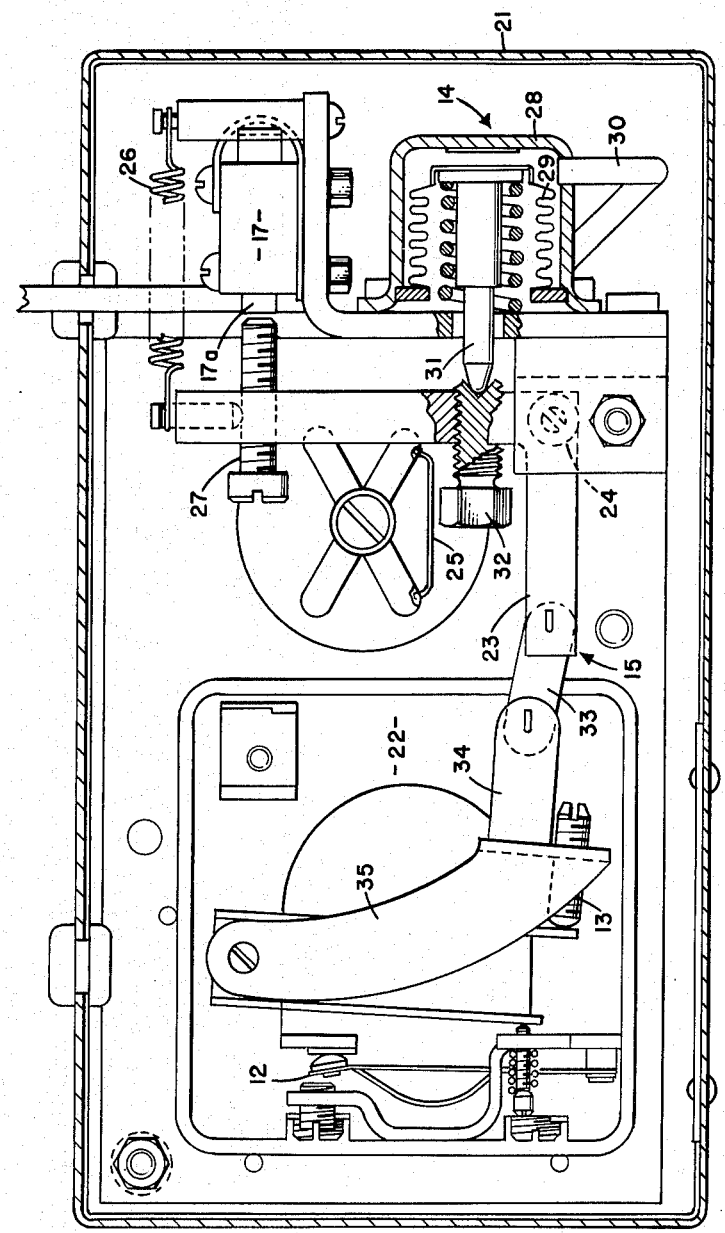
FIG. 4 is a top plan view partly in section of the construction of FIG. 3.

The ratio of the time during which contact 12 is closed to the time during which it is opened and which determines the time taken by the motor 1 to drive the cam 5 to its position in which it operates the switch contact 7, is adjusted by a mechanical stop 13 (FIGS. 1, 3, and 4) which engages the bi-metallic strip 10 and determines the amount of movement required before the contact 12 is opened. The position of the stop 13 is controlled by means of a temperature sensitive system including a bellows unit 14 connected to the stop 13 by a linkage indicated generally at 15 (FIGS. 1, 3, and 4). Linkage 15 is proportioned to give a required relation between the temperature in the sterilizing chamber and the time taken by the motor to drive the cam 5 to operate the switch contact 7. The bellows unit 14 is connected to a temperature responsive bulb 16 positioned in a sterilizing chamber (not shown). It will be understood that when used in the preferred described manner with a sterilizer, the bulb 16 of our invention may be positioned inside the load to be sterilized.

A further switch 17 is connected to the common lead to the motor and the heater, and is adapted to be operated by the linkage 15 for the purpose and in the manner hereinafter more fully described.

Three leads 18, 19, and 20 are shown connected to the control unit, the lead 18 being connected to one end of the heater 11, to one end of the winding of the clutch operating electromagnet 8, and to one terminal of the motor 1. Lead 19 is connected to one terminal of the switch contact 7, to the other end of the electromagnet 8, and also through the switch 17, a fuse 25 and the contact 12 to the other end of the heater 11 and to the other terminal of the motor 1 thereby to constitute a common lead to the motor and the heater. The lead 20 is connected to the other terminal of the switch contact 7.

The leads 18, 19 and 20 are connected to a control apparatus or mechanism, not constituting part of this invention, which effectively controls the flow of steam to a chamber of a sterilizer in the manner described in our co-pending U.S. application Serial No. 14,490. When the sterilizing period is to be initiated, leads 18 and 19 are energized thereby operating the electromagnet 8 to engage the clutch 3, and energizing the motor 1 and the heater 11. The motor then rotates under the control of the energy regulator including the bi-metallic strip 10 as hereinbefore described and upon termination of the sterilizing period as determined by the temperature sensitive system of the bellows unit 14, the cam 5 closes the switch contact 7 which completes the circuit including leads 19 and 20 causing the control apparatus or mechanism to terminate the sterilizing period and to de-energize the circuit including leads 18 and 19. The motor and the heater are thus disconnected and the clutch 3 is released to permit the cam 5 to return to its normal position and open the switch contact 7.

Figure 2:
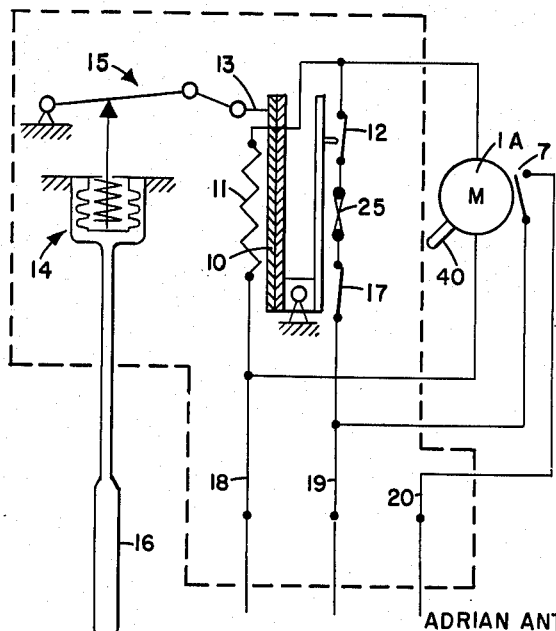
FIG. 2 shows diagrammatically another form of this invention.

Referring to FIG. 2, we have diagrammatically shown a second embodiment identical to that shown in FIG. 1 except that we have substituted a spring return timer motor 1A in lieu of the motor 1, shafts 2 and 4, clutch 3, electromagnet 8 and cam 5. All parts in FIG. 2 corresponding to identical parts shown in FIG. 1 are designated by the same numeral.

The spring return timer motor 1A has a cam member 40 having a normal position which is the initial position of a timing cycle. When the circuit including the motor 1A is energized, this cam member moves counter-clockwise until the switch 7 is closed. Thus, the cam member performs the same switching function as cam 5 of FIG. 1. However, cam member 40 is controlled in a different manner. As distinguished from the arrangement shown in FIG. 1, when the contact 12 de-energizes the motor circuit, the cam member 40 starts winding backwardly or in a clockwise direction until contact 12 closes the motor circuit again. When this circuit is re-energized, the cam member 40 commences its counter-clockwise movement again and eventually closes the switch 7, unless switch 17 causes the time-temperature integrator to completely recycle in the manner described below.

Referring now to FIGS. 3 and 4, the control unit shown therein comprises a sealed housing 21 enclosing the aforementioned energy regulator indicated generally at 22, the bellows unit 14, the linkage 15 and the switch 17. The linkage 15 includes an L-shaped lever 23 pivoted as at 24 and is spring-biassed for rotation in a clockwise direction as viewed in FIG. 4 by means of a tension spring 26 secured to the free end of the longer leg of the L-shaped lever.

The switch 17 is operated by a screw threaded actuating stud 27, threaded through the free end of the longer leg of the lever 23. The switch 17 operates to close its circuit when the operating lever 17a of the switch is extended and opens the circuit when the lever 17a is engaged by the actuating stud 27.

It will be understood that the switch 17 (FIG. 1) could be located in a position which diagrammatically in FIG. 1 would be below the top lead line to the electromagnet 8 so as to be connected in the lead line common to the electromagnet 8 as well as the motor and heater. This switching arrangement de-energizes the electromagnet 8 when 17 is operated by the screw threaded stud 27. Thereby, the clutch 3 is released to permit the cam 5 to return to its normal position under the action of the biassing means of the cam shaft 4.

The bellows unit 14 comprises a sealed casing 28 housing a bellows 29, the casing being connected by tubing 30 to the aforementioned bulb 16 (FIG. 1) and forming therewith a fluid-filled temperature responsive system which upon increase of temperature of the bulb causes the bellows 29 to contract, thereby to urge outwardly a spindle 31 which is spring loaded into engagement with the base of the bellows. The spindle 31 engages an adjustable screw threaded stud 32 on the said longer leg of the lever 23 so that upon a predetermined outward movement of the spindle 31, i.e. upon the bulb 16 reaching the predetermined temperature, for example, 250° F., the lever 23 pivots counterclockwise as seen in FIG. 4 to release the switch 17 to the circuit-closed position thereby to complete the energizing circuit for the timer motor 1 and the heater 11. The shorter leg of the L-shaped lever 23 is connected by a pivoted link 33 to an extension member 34 secured to the operating lever 35 of the energy regulator 22. The lever 35 carries the mechanical stop 13. The respective lengths of the said shorter leg, the link 33 and the extension member 34 are made such that pivotal movement of the lever 23 under the action of the bellows 29 is transmitted to the lever 35 of the energy regulator 22 in such a way that the law governing the relationship between sterilizing temperature and the time required for sterilization is followed. In this manner, if during the sterilizing period the temperature in an autoclave falls below the required temperature, the energy regulator 22 is adjusted by means of lever 23 and link 33 to prolong correspondingly the sterilizing time by adjusting the position of the stop 13.

With the arrangement described, sterilizing times of from three minutes at 275° F. up to fifteen minutes at 250° F. can be reliably obtained in an autoclave. Below 250° more extended times are required which cannot be obtained consistently with this arrangement and the switch 17 is therefore provided which is operated directly by the bellows unit 14 through the lever 23 to prevent the circuit to the motor 1 being completed when the temperature falls appreciably below 250° F. If the switch 17 is located in the lead line common to the electromagnet, heater and motor, then the circuit including the electromagnet 8 is also de-energized, thereby causing the timer clutch 3 to disengage and allow the driven cam 5 to be returned to its starting or normal position by the biassing means of the cam shaft 4.

It will be understood that the invention is not limited to the application thereof above described and that it may find other application in fields in which an operation is required to be effected after a predetermined period at a given temperature and in which it is required that the period be varied to compensate for variations from the given temperature.

It will likewise be understood that while I have shown and described the preferred form of mechanism of my invention it will be apparent that various modifications and changes may be made therein, particularly in the form and relation of parts, without departing from the spirit of my invention as set forth in the appended claim.

What we claim:

1. A time-temperature integrator apparatus comprising, in combination, a timing device for effecting a control operation after a predetermined period of time, interrupter means for varying said predetermined period of time and temperature sensitive means responsive to a controlling temperature during said time period operatively connected to said interrupter means to adjust the time period of the timing device in accordance with variations in said controlling temperature during said time period.

2. A time-temperature integrator apparatus comprising, in combination, an electrically operated timer for effecting a control operation after a predetermined period of time, an energy regulator controlling the electrical supply to said timer for varying the predetermined period of time and a temperature sensitive means responsive to a temperature source and operatively connected to said energy regulator for controlling operation thereof to adjust the time period of said timer in accordance with variations in the temperature at said source.

3. A time-temperature integrator apparatus for effecting a control operation comprising, in combination, a timer motor for transmitting a predetermined angular rotation corresponding to a predetermined period of time, cam means controlled by said motor for actuating a switch to effect said control operation after said predetermined angular rotation is transmitted to said cam, an energy regulator controlling the electrical supply to said motor for varying the predetermined period of time and a temperature sensitive means responsive to a temperature source and operatively connected to said energy regulator for controlling operation thereof to adjust the time period of said motor in accordance with variations in the temperature of said source.

4. A time-temperature integrator apparatus comprising, in combination, an electrical timer circuit, an electrically operated timer in said circuit for effecting a control operation after a predetermined period of time, a contact completing said circuit, heater means in said circuit, a bi-metallic strip responsive to said heater means for periodically interrupting said circuit by breaking said contact when said strip is heated by the current flowing in said heating means, and a temperature sensitive means responsive to a temperature source and operatively connected to said bi-metallic strip for controlling operation thereof to adjust the time period of said timer in accordance with variations in the temperature of said source.

5. Apparatus in accordance with claim 4 wherein said temperature sensitive means is operatively connected to said bi-metallic strip by a linkage and an adjustable stop connected to said linkage which stop is pivotally mounted to engage said bi-metallic strip, said temperature responsive means being connected to and acting through said linkage to adjust the position of the stop relative to the bi-metallic strip to vary the frequency of said periodic interruptions of said timer circuit.

6. Apparatus in accordance with claim 5 including a second switch normally closing the timer circuit and wherein said linkage includes a lever, said lever being adapted to operate said second switch to open said circuit when the temperature at said source falls below a predetermined temperature, thereby preventing the operation of said timer by said bi-metallic strip.

7. A time-temperature integrator apparatus for effecting a control operation comprising, in combination, a timer circuit including a heater resistance, a timer motor in said circuit for transmitting a predetermined angular rotation corresponding to a predetermined period of time, a cam, an electromagnetic clutch coupling said cam to said motor, a switch, said cam actuating said switch to effect said control operation after said predetermined period of time, a contact completing said timer circuit, a bi-metallic strip for periodically interrupting said circuit when said strip is heated by the current flowing through said heater resistance, temperature responsive bellows being responsive to a temperature source, a linkage, said bellows being operatively connected to said bi-metallic strip by said linkage and an adjustable stop connected to said linkage which stop is mounted to engage said bi-metallic strip, said temperature responsive bellows being connected to and acting through said linkage to adjust the position of the strip to vary the frequency of said periodic interruptions of said timer circuit.

8. Apparatus in accordance with claim 7 including a second switch normally closing the timer circuit and wherein said linkage includes a lever, said lever being actuated to operate said second switch to open said circuit when the temperature at said source falls below a selected temperature, thereby preventing the operation of said timer motor by said bi-metallic strip.

9. Apparatus in accordance with claim 8 including means for returning said cam to a normal position in which it is ready to start a new timing cycle when said clutch is disengaged, said second switch being effective to open the circuit electrically controlling said electromagnetic clutch at the time the temperature at said source falls below the selected temperature, thereby permitting said cam to be returned to its normal position.

10. A time-temperature integrator apparatus comprising, in combination, electrical timer means for actuating an operation after a heat source has been maintained at a predetermined temperature for a predetermined period of time and means in circuit with said timer responsive to the temperature at said source for controlling the supply of electrical current to said timer during said period to vary said predetermined period of time in accordance with variations in the temperature at said source during said period.

11. A time-temperature integrator apparatus comprising, in combination, an electrical circuit, an electrically controlled timer means in circuit for actuating an operation, circuit interrupter means for periodically interrupting and for controlling said timer to actuate said operation after a heat source has been maintained at a preselected temperature for a preselected period of time, and means responsive to the temperature at said source of heat for controlling said interrupter means to vary said predetermined period of time in accordance with temperature variations at said source.

12. A time-temperature integrator apparatus comprising, in combination, an electrically operated timer for effecting a control operation after a predetermined period of time, an energy regulator controlling the electrical supply to said timer for varying the predetermined period of time, a temperature sensitive means responsive to a temperature source and operatively connected to said energy regulator for controlling operation thereof to adjust the time period of said timer in accordance with variations in the temperature at said source, and means connected to said temperature sensitive means for preventing the circuitry, electrically operating said timer, for being completed when the temperature at said source drops below a preselected minimum value.

13. A time-temperature integrator apparatus comprising, in combination, an electrically operated timer for effecting a control operation after a predetermined period of time, comprising a re-wind timer motor and a cam member controlled by said motor to effect said control operation after predetermined angular rotation of said cam; an energy regulator controlling the electrical supply to said timer motor for varying the predetermined period of time; and a temperature sensitive means responsive to a temperature source and operatively connected to said energy regulator for controlling operation thereof to adjust the time period of said timer motor in accordance with variations in the temperature at said source.

14. A time-temperature integrator apparatus for effecting a control operation comprising, in combination, a timer motor for transmitting a predetermined angular rotation corresponding to a predetermined period of time, cam means controlled by said motor for actuating said switch to effect said control operation after said predetermined angular rotation is transmitted to said cam, a heating element in circuit with said motor, a contact completing said circuit, and a bi-metallic strip responsive to said heating element for periodically interrupting said circuit by breaking said contact from said circuit when said strip is heated by the current flowing in said heating element, and a temperature sensitive means responsive to a temperature source and operatively connected to said bi-metallic strip for controlling operation thereof to adjust the time period of said motor in accordance with variations in the temperature of said source.

15. Apparatus comprising, in combination, an electrically controlled time; circuit interrupter means for periodically interrupting circuit to said timer for timing a selected condition at a source for a preselected period of time; and, means responsive to said condition at said source controlling said interrupter means for adjusting said predetermined period of time in accordance with variations of said condition at said source.

16. A time-temperature integrator apparatus comprising, in combination, timer means for actuating an operation after a predetermined period of time, temperature responsive means to adjust the time period of said timer means in accordance with variations in temperature, and temperature responsive means for re-cycling said timer means if the temperature source falls below a preselected level.

17. Apparatus comprising in combination, a timer; interrupter means for periodically interrupting said timer for timing a selected condition at a source for a preselected period of time; and means responsive to said condition at said source controlling said interrupter means for adjusting said perdetermined period of time in accordance with variations of said condition at said source during said period.

18. Apparatus comprising, in combination, an electrically controlled timer for timing, means for controlling said circuit to said timer for prolonging said timing thereby to time a selected condition at a source for a preselected period of time; and means responsive to said condition at said source controlling said last mentioned means for adjusting said predetermined period of time in accordance with variations of said condition at said source during said period.

19. Apparatus comprising, in combination, an electrically controlled timer; control means in said circuit controlling said circuit for timing a selected condition at a source for a preselected period of time; and means responsive to said condition at said source controlling said control means for adjusting said predetermined period of time in accordance with variations of said condition at said source during said period.

References Cited by the Examiner
UNITED STATES PATENTS

| | | | |
|---|---|---|---|
| 1,667,001 | 4/1928 | Gray et al. | 307—141 |
| 1,700,661 | 1/1929 | Appelberg | 307—141 |
| 2,389,434 | 11/1945 | Huck | 307—141 |
| 2,391,718 | 12/1945 | Lindemann | 307—141.4 |
| 2,564,321 | 8/1951 | Brosseau | 307—141 |
| 2,621,730 | 12/1952 | Graham | 307—141 |
| 2,641,316 | 6/1953 | Brown et al. | 307—141 |
| 2,742,546 | 4/1956 | Cart | 200—136.3 |
| 2,744,337 | 5/1956 | Raney | 200—136.3 |
| 2,962,610 | 11/1960 | Husband | 307—141.4 |
| 3,070,714 | 12/1962 | Jacobs | 307—141 |
| 3,093,722 | 6/1963 | Schauer | 200—136.3 |

LLOYD McCOLLUM, *Primary Examiner.*

ORIS L. RADER, MILTON O. HIRSHFIELD,
*Examiners.*